Oct. 8, 1963  W. J. ROZMUS  3,106,013
METHOD OF PRESSURE WELDING METALS
Filed Jan. 28, 1959  2 Sheets-Sheet 1

INVENTOR.
WALTER J. ROZMUS
BY Pyle & Fisher
ATTORNEYS

Oct. 8, 1963 W. J. ROZMUS 3,106,013
METHOD OF PRESSURE WELDING METALS
Filed Jan. 28, 1959 2 Sheets-Sheet 2

INVENTOR.
WALTER J. ROZMUS
BY Pyle & Fisher
ATTORNEYS

United States Patent Office 3,106,013
Patented Oct. 8, 1963

3,106,013
METHOD OF PRESSURE WELDING METALS
Walter J. Rozmus, Whitesboro, N.Y., assignor to
Kelsey-Hayes Company
Filed Jan. 28, 1959, Ser. No. 789,669
12 Claims. (Cl. 29—470.1)

This invention relates in general to pressure welding techniques, and relates more specifically to apparatus and method of joining light gauge material.

Pressure welding of aluminum and copper is now a well known and common process. Many useful apparatuses have been developed for producing and controlling the upset forge action needed to cause such welds.

It has been found that a true metallurgical weld is produced by extending a length of the workpiece from the dies sufficient to allow the contacting surfaces to expand in area while in mutual contact under high pressure.

It has also been determined that pressure welds cannot be created whenever contamination exists between the surfaces. Even a finger print by a clean hand can prevent a weld.

Further, in sections of thin gauge, good butt welds have never been produced because the thin material tends to fold rather than forge if sufficient material to produce a weld is projected from the weld dies.

Hence, one of the principal objects of this invention is to provide an improved new method of carrying out a pressure weld procedure, to produce a good butt weld of thin gauge material, either in sheet form or wire.

Another object of this invention is to provide an improved new process which obviates the need for special prior workpiece preparation or cleaning.

More specifically, it is the object of this invention to provide a multi-step weld procedure carried out to an extent that will produce a complete interface movement to the flash area of a pressure weld, in thin gauge material to assure a weld, and in any material to avoid the necessity of prior cleaning.

Another object of this invention is to provide new and improved apparatus to provide an accurate workpiece projection from the face of a welding die, and which will permit a superior workpiece cleaning and preparation of workpieces when such preparation is desired.

Other objects and a fuller understanding of the invention may be had by referring to the following description and claims, taken in conjunction with the accompanying drawing, in which:

Figure 7:
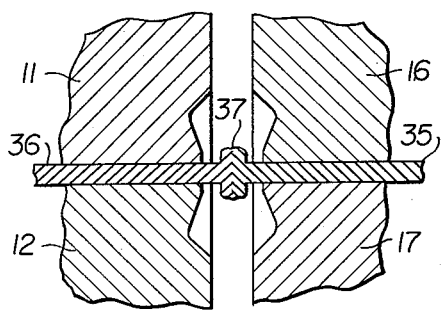
Figure 8:
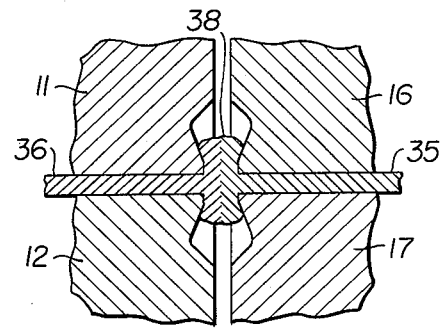
Figure 9:
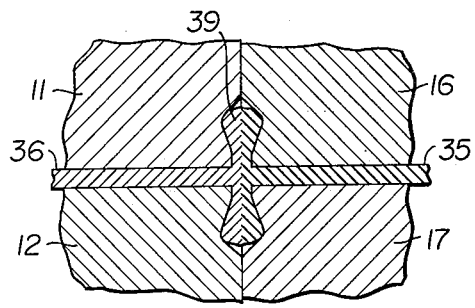
Figure 10:
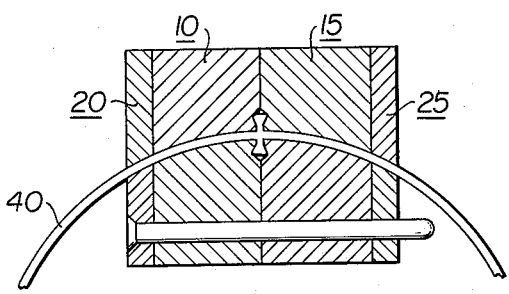

FIGURES 7, 8, and 9, illustrate the new process steps employed to successfully weld very thin materials, and/or to weld without cleaning prior to welding; and FIGURE 10 illustrates a practical commercial use of the apparatus and process of this invention in the making of annular rings, tubes, or cans.

There are many possible devices which may be employed to activate pressure welding dies. Some such devices are hand operated whereas others have been built as bench and floor model press type machines. The present invention may be activated by any suitable apparatus of this type.

However, since the force used to close a pair of split dies may be supplied in any of these suitable manners and the force employed to close the split dies toward one another may also be obtained from any of the suitable devices, the drawings of this teaching are set forth schematically in order to illustrate the new concept which has been developed and tested to solve a particular problem. Thus, the reader need not be confused as to the teaching which is attempted here, and can adapt this basic teaching to small or large apparatus as his needs may dictate. The apparatus which is to be hereinafter described, and which is illustrated in the drawings, and the process which will be set forth have all been actually employed and proven by the use of adapted actuating equipment not necessarily intended for the operation of the illustrated dies. Thus, the drawings illustrate a truly operative equipment although not necessarily commercially perfected or adapted apparatus.

Broadly stated, the basic process concept of the present invention, is embodied in the method of producing a true pressure created butt weld between members which are normally too thin to weld by the accepted techniques. Subgeneric to this basic concept of the process is the discovery that whether the workpieces are too thin to weld by ordinary processes or not, they can be successfully welded in a true pressure weld without the necessity of first cleaning the members.

To clarify for better understanding, it should be recognized at the outset that all pressure junctions created between metal members are not necessarily true pressure welds. Pressure alone will create a bond which is not a true weld between two pressure weldable materials; such, for example, as aluminum and copper. Pressure bonding created by pressing large areas together under considerable pressure will produce a strong bond which is not an actual weld. This process is being used for many types of structures, such as the tube walled refrigerators now being commercially produced. However, pressure bonding alone is not always satisfactory for all purposes; it is entirely possible to create a true pressure weld by confining of flow of the metals as they move outwardly from the pressure area under confinement and high pressure. It is the latter true pressure weld which is of concern in this instance.

Figure 1:
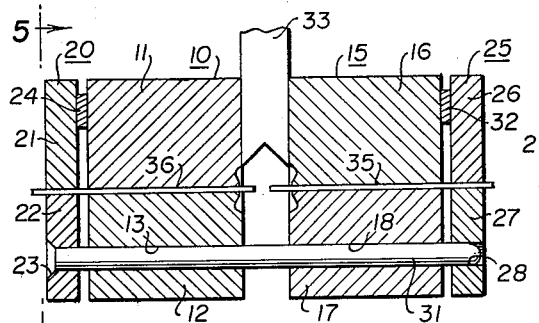
FIGURE 1 is a schematic illustration of pressure weld dies embodying the structural principles of this invention, and capable of carrying forth the new process concept.

In FIGURE 1 of the drawings, the schematic illustration of apparatus, there is set forth a composite split die 10 and a composite split die 15. Die 10 is composed of an upper section 11 and a lower section 12. Die 15 is composed of an upper section 16 and a lower section 17. These dies are not particularly unique in any material respect and they comprise a conventional passageway through the split die by reason of mated cavity surfaces on each of the die sections. Furthermore, the face areas of the dies are formed in the manner best illustrated in the larger sections of FIGURES 7 through 9. These spaced formations have been disclosed in other patents, and are now widely used for commercial pressure welding operations. Any suitable apparatus which will clamp the two die sections together and thereafter move the composite dies together in face-to-face abutment with sufficient pressure to upset and weld the workpieces will be satisfactory.

It is necessary that the dies 10 and 15 move in true relationship with respect to one another and be held against offset movement under the thrust created by the upset welding action. To illustrate a suitable type of guide device a guide bar bearing passageway 13 is provided in die section 12 and a similar bearing passageway 18 in the die section 17. Guide bar 31 is then employed as a rail or guide device to keep the dies in alignment, and in this case, in rectilinear movement.

Although this invention includes a process which will be hereinafter further disclosed, which can eliminate the need for cleaning and preparation of workpieces, nevertheless, it is often desirable to clean workpieces before welding. In fact, until the discoveries of this invention it has always been assumed that cleaning was essential. One may refer to the early patents granted to Sowter of the General Electric Company, England, to see the great emphasis upon cleaning. In fact Sowter has taught that only scratch brushing would be sufficiently adequate to prepare workpieces for pressure welding. Chemical cleaning was believed by Sowter not to be satisfactory.

Apparatus has been provided which will create a clean cut on the end of a pair of workpieces to be butt welded, and this apparatus is used after the workpieces are clamped in the dies in order to prevent any recurrence of contamination by oxidation, finger prints, or other foreign matter. In fact, apparatus has been introduced which has guide and stop devices to hold a blade at a fixed distance from the surface of a die in order not only to prepare the workpiece for immediate welding but also to accurately gauge the distance of projection of the workpiece from the die. It has been shown that only a certain optimum projection of workpieces from pressure dies is capable of producing a good weld. This projection is closely related to the cross-sectional thickness of the workpiece. In average wire and sheet the projection is somewhere around a distance equal to a cross section thickness of the metal being welded. The exact projection distance must be determined by the particular material and form of material. The principles for selecting the projection distance are now well known and understood, and therefore it is not essential to outline these requirements here.

However, the preparation of workpieces at a distance from the face of the dies has necessitated special equipment and even then it is sometimes difficult to obtain a good preparation at a distance from the die face and to be sure that the projection after preparation is exactly as required. The apparatus of this invention solved that problem to perfection. Referring once again to FIGURE 1, it may be seen that a gripping jaw 20 having a section 21 and a section 22 is associated with the split die 10 and that a similar gripping jaw 25, having a section 26 and 27 is associated with the split die 15. The jaw 20 is slidable relative to the die 10 upon the guide bar 31. A guide bar bearing opening 23 is provided to permit such guided movement. In like manner, the gripping jaw 25 is guided upon the same guide bar 31 by means of the guide bar bearing opening 28. The gripping jaws are not in any way connected to or limited in their travel by any inherent relationships with respect to their associated dies. They are located adjacent the back surface of the dies, as illustrated, and unless otherwise constrained are free to move between a contact position against the back surface of the associated die, or removed from the back surface a distance as far as desired or limited by any suitable stop means which may be chosen. In fact, they may be completely separable from the construction if so desired.

Associated with each of the split dies and its related gripping jaw is a spacer device. Between die 10 and gripping jaw 20 there is provided a spacer 24. Between the die 15 and the gripping jaw 25 there is a spacer 32.

Figure 5:
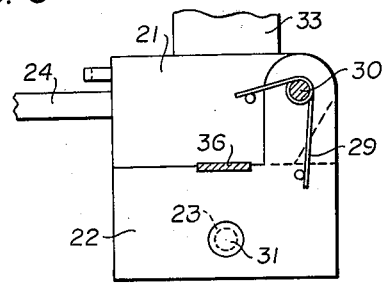
FIGURE 5 is an end view taken along line 5—5 of FIGURE 1.
Figure 6:
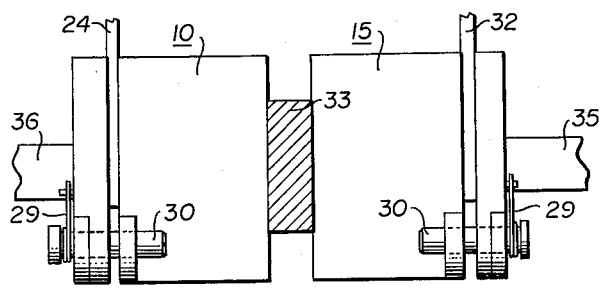
FIGURE 6 is a top plan view of the die group of FIGURE 1.

Reference to FIGURE 5 and to FIGURE 6 will illustrate more clearly the inter-relationship of the dies and their gripping jaws and spacers. The gripping jaws are designed to grasp a workpiece which is extended through the associated split die. The grip is not an extremely great grip, but is tight enough to prevent slippage. A spring 29 will usually suffice to create a closing action of sufficent gripping force. In the FIGURE 5 it will be seen that the top section 21 of the gripping jaw 20 is pivoted upon a pivot pin bar 30 carried by the lower section 22. The bar 30 extends completely along the apparatus and serves as an operational pivot for the gripping jaw 25 and its associated sections 26 and 27. Thus, the gripping jaws are pivotally actuated and urged together by a resilient holding force, and are provided with two guide rail devices for easy longitudinal movement between the active stations of the gripping jaws.

Also as best seen in the FIGURE 6 is a knife device 33 which is pivotally swung upon the pivot pin bar 30 and is movable between the face areas of the dies 10 and 15. By bringing the knife 33 between the dies and then urging the dies snugly against the surfaces of the knife, the knife can be brought down between the dies and will cut off any part of a workpiece projecting from the face of the dies. Any such cut, it will be readily recognized, will be a clean square-ended severance for the simple reason that the workpiece is fully supported by the workpiece holding cavity and hence only the projected portion will be cut away without any drag or deformation of the workpiece face. If desired, roughened metal surfaces may be employed on the knife or the knife may be formed of a particular material which will aid in galling the workpiece surfaces.

To complete the teaching of this first aspect of this invention, the operation of the apparatus will now be explained. Workpieces are selected, as illustrated in the drawings by the reference characters 35 and 36. These workpieces illustrated in FIGURE 1 are ribbons of thin gauge metal which normally would not be projectable a distance from the dies sufficient to cause a proper weld. These workpieces are grasped in the respective dies 10 and 15 with a light holding force. Spacers 24 and 32 are moved into the position illustrated in FIGURE 1 and the respective gripping jaws 20 and 25 are moved against the spacers as illustrated. Thus, the distance of the jaws with respect to the back surfaces of the dies is accurately determined by the gauge of these spacers. The jaws are permitted to grip the workpieces at this time with a grip provided by the spring actuation for holding the workpieces temporarily. Thereafter, the knife 33 is brought down between the die faces as before described, and the excess projection of the workpieces from the face of the dies 10 and 15 is severed cleanly and smoothly to the die faces.

Figure 3:
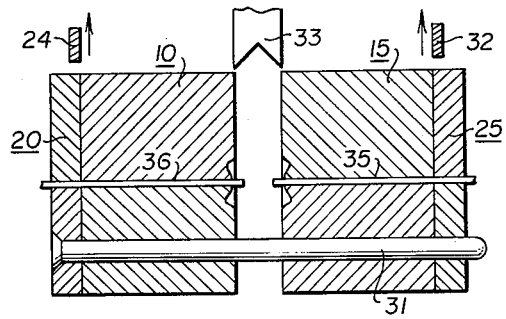
FIGURE 3, illustrates the improved new projection advancement step produced by this invention.

Thereafter, the knife is removed from the position between the dies and the spacers are swung out of the stop condition, as illustrated in the FIGURE 3. Thereafter the gripping jaws are moved against the back surfaces of their respective dies. In so advancing, as illustrated in FIGURE 3, the workpieces are advanced through the split dies and will project once again from the face areas of the split dies. However, the amount of advancement is precisely and accurately determined. The distance will be equivalent to the gauge of the spacer parts provided. Hence, it will be seen that this advancement can be accurately controlled by selecting the desired thickness for the spacer members.

After the jaws have been positioned against the back surfaces of their respective dies, the entire assembly is then actuated by the selected apparatus to grip tightly upon the split dies and clamp the workpieces in the split dies with a holding force of great magnitude. The driving force is applied to the back of the entire assembly to move the split dies against one another in face-to-face abutment and create a mutual upsetting of the abutted workpieces.

If the workpieces are of sufficient thickness that they will create a weld in one welding operation, then the steps as thus far described will be sufficient and the workpieces may be removed from the dies and the excess flash trimmed from the weld area.

However, this apparatus has been found to be operable to carry out a process of new discovery having tremendous importance. As previously indicated it is not always possible to project sufficient material from the die surfaces whenever an exceedingly thin gauge material is to be welded. In FIGURES 7 through 9, a progressive weld operation is illustrated. The fragmentary sections set forth in the FIGURES 7, 8, and 9 are enlargements of the weld area of the composite die. The FIGURE 7 is an enlargement of the initial upset stage illustrated in FIGURE 4. It will be seen that the amount of flash material projecting from the weld area is quite small. Such amount of projection would normally be insufficient to have created a genuine cold pressure weld. As previously stated, the essence of creating a true pressure butt weld is to cause a mutual flow of material under extreme pressure and confinement to a degree great enough to allow the material to integrate and create a complete composite weld.

Figure 4:
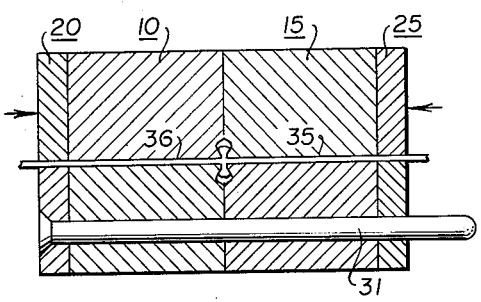
FIGURE 4 illustrates a weld closing step in the use of the apparatus.

It has been discovered, completely contrary to many previous teachings with respect to pressure weld, that rather than accept a partial weld as created by this first step of operation illustrated in FIGURES 4 and 7, that the dies may be opened a distance corresponding to approximately twice the projection distance of one of the original workpieces and the dies once again clamped upon the workpieces and closed in a second, or even a third and more operations, to rework the weld and cause a continuation of the inner face upsetting until the material has been moved aside by working to a degree which creates a complete and true pressure weld. Three such steps are illustrated in the series of FIGURES 7 through 9. In the final FIGURE 9 it will be seen that the weld cavity has been filled to a degree corresponding to the degree normally created in a thicker material heretofore welded in a single operation. The upset material, after each of the successive steps, is identified by the numerals 37, 38, 39 in FIGURES 7 through 9 respectively. The workpieces have not been bent aside as would normally be expected for the reason that the series of upsets have taken place in small increments and have been repeated a number of times rather than to attempt a one-step welding operation. This multiple upset concept has now been fully established as being acceptable to create a very strong and true pressure weld in thin gauge sheet materials.

Figure 2:
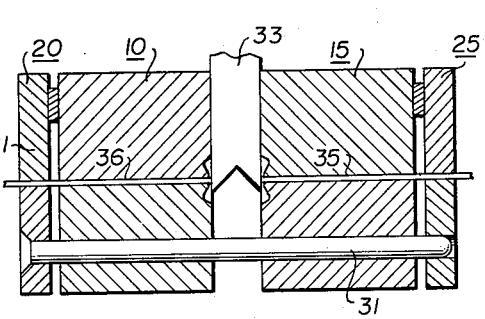
FIGURE 2 illustrates a work preparation step sometimes employed prior to weld operation.

Finally, in the carrying forth of this process as described, a truly remarkable discovery has been made contrary to all previous pressure welding teaching, and that discovery is that the cleaning and preparation step as illustrated in FIGURES 1 through 3 of the drawings may be avoided in either thin material or conventional gauge material by the repeated upset process. It has been discovered, that material which is contaminated and dirty on its edge, and hence normally considered unweldable, may in fact be welded by repeating the upset process until all of the contaminated material has been caused to flow out of the weld area into the form of a flash. If conventional gauge material is employed, such repeat upsetting process will require a greater-than-normal cavity on the die faces to hold the excess material. This discovery is of exceedingly great importance to the use of pressure welding of sheet for commercial applications. For example, it has long been desired to make aluminum containers for food, oil, and other materials. The efforts heretofore have been confined to lap welded seams for the simple reason that the gauge of the material which is desired for such a container has been less than that considered to be butt weldable. By the repeat process set forth herein, such butt welding is entirely possible.

Now it has been discovered that this invention will make the production of sheet welds for producing can seams even more practical because the cleaning step may be eliminated. Thus, the rapidity and speed of production necessary for economical production of cans is entirely possible.

The FIGURE 10 illustrates a practical commercial use of the present invention. Here it will be seen that the sheet of material has been folded and that each of the ends of the single sheet are abutted as illustrated with the separate workpieces in the previous figures. Without any cleaning preparation whatsoever the repeat process as described will cause a flow of the contaminated dirty edges completely out of the weld area and a perfectly acceptable butt welded seam results.

The first step in making such a can by this process is to produce a cylindrical form without ends. Such step is illustrated in FIGURE 10. Then, if desired, the excess flash material may be removed even from the inside of the cylinder. Thereafter, this completely welded, truly reliable, cylindrical structure may be fitted with pressure welded end caps to seal the contents within a container.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. The improvement of producing a true pressure weld between pressure weldable metal materials at temperatures less than required for heat welding comprising the steps of providing a first and a second workpiece to be joined by a pressure weld; grasping said first and second workpieces by first and second pressure weld forming dies with the workpieces extending from the respective dies a distance sufficient to cause upsetting of the workpieces on closing of the dies and with dirty and contaminated ends of said first and second workpieces in abutment in a weld area, said first and second dies being in spaced relationship; thereafter closing said first and second dies together to upset the workpieces by mutual contact under high pressure, thereby causing contaminated material to flow out of the weld area in the form of a flash and preliminarily joining said workpieces without forming a true pressure weld; thereafter releasing the grip of said dies on the preliminarily joined workpieces followed by indexing the dies to their spaced relationship with the joined workpieces remaining in contact position; regrasping said workpieces a sufficient distance from the contact position to cause further upsetting of the workpieces on closing of said dies; and repeating the upsetting work cycle at least a second time until substantially all of the contaminated material has been caused to flow out of the weld area into the form of a flash and a true pressure weld has been formed between the clean, uncontaminated ends of said workpieces.

2. The improved method of producing a true pressure weld between pressure weldable metal materials at temperatures less than required for heat welding comprising the steps of providing a first and a second workpiece to be joined by a pressure weld; grasping said first and second workpieces by first and second forming dies in spaced relationship with the workpieces extending from the respective dies a distance sufficient to cause upsetting of the workpieces on closing of the dies and with dirty and contaminated ends of said first and second workpieces in abutment; thereafter causing said first and second dies to close together to upset the workpieces by mutual contact under high pressure without forming a true pressure weld, thereby flowing contaminated material out of the area of contact in the form of a flash; thereafter indexing said dies into spaced relationship with the workpieces remaining in end abutment; regrasping said workpieces a sufficient distance from their abutting ends to cause further upsetting of the workpieces on closing of the dies; and repeating the upsetting work cycle at least a second time until substantially all of the contaminated material has been caused to flow out of the weld area into the form of a flash and a true pressure weld has been formed between the clean, uncontaminated ends.

3. The method of pressure welding thin flat sheet stock of pressure weldable metal material into tubular form comprising the steps of providing a sheet of material having first and second dirty and contaminated mateable edges; looping said sheet into generally circular cross-sectional form; grasping said looped workpiece by first and second forming dies in spaced relationship with said first and second edges facing each other and extending from the respective dies a distance sufficient to produce an upset in a weld area when the dies are closed together; closing said dies together to upset said edges by mutual contact under high pressure, thereby causing contaminated material to flow from the weld area into the form of a flash and effecting a preliminary juncture between said edges; thereafter indexing said dies into spaced relationship with the joined edges remaining in contact position; regrasping said workpiece a sufficient distance from the contact position to cause further upsetting on closing of the dies; and repeating the upsetting work cycle at least a second time until substantially all of the contaminated material has been caused to flow out of the weld area into the form of a flash and a true pressure weld has been formed between the clean, uncontaminated edges.

4. The process of pressure welding comprising:
 (a) providing pressure weldable metal material having dirty and contaminated end faces,
 (b) grasping said material by die means with said end faces facing each other and extending from said die means a distance sufficient to produce an upset,
 (c) forcing said end faces together by said die means to effect an upsetting lateral flow of portions of said material in a weld area, thereby displacing contaminated material from the weld area in the form of a flash and causing a preliminary joining of the material,
 (d) releasing said material and then regrasping two other portions with each portion being a sufficient distance from the weld area to produce further upsetting lateral flow, and
 (e) forcing said portions toward one another by said die means to cause additional upsetting lateral flow until substantially all of the contaminated material has been caused to flow out of the weld area into the form of a flash and a true pressure weld has been formed between clean, uncontaminated surfaces.

5. The process of pressure welding comprising:
 (a) providing pressure weldable metal material having dirty and contaminated end faces,
 (b) gripping portions of said material by a pair of split dies with said end faces facing each other and extending from the respective dies a distance sufficient to produce an upset in a weld area when said dies are forced together,
 (c) forcing said end faces together and laterally upsetting material adjacent said faces by forcing the dies together, thereby causing contaminated material to flow from the weld area in the form of a flash, effecting a preliminary union between said end faces, and overcoming any misalignment of said end faces,
 (d) opening said dies,
 (e) moving said dies away from one another,
 (f) closing said dies to regrip the material a sufficient distance from the weld area to effect further upsetting, and
 (g) forcing said dies toward one another to upset further material until substantially all of the contaminated material has been caused to flow out of the weld area into the form of a flash and a true pressure weld has been formed between clean, uncontaminated ends of the material.

6. The process of claim 5 wherein said dies are moved an equal distance after the completion of step (d) and the flash is midway between the dies during step (f).

7. The improved method of producing a true pressure weld between pressure weldable metal materials at temperatures less than required for heat welding comprising the steps of providing a first and a second workpiece to be joined by a pressure weld; grasping said first and second workpieces by first and second pressure weld-forming dies with dirty and contaminated surfaces of said material facing each other and extending from the respective dies a distance sufficient to produce an upset in a weld area when the dies are forced together, said first and second dies being in spaced relationship; thereafter causing said first and second dies to close together to upset said surfaces by mutual contact under pressure without forming a true pressure weld, thereby forcing contaminated material to flow out of the weld area into the form of a flash; thereafter releasing the grip of said dies on said workpieces followed by indexing of said dies relative to the workpieces into spaced relationship; regrasping said workpieces a sufficient distance from the weld area to again produce an upset when the dies are closed together; and repeating the upsetting work cycle to upset additional portions of the workpieces at least a second time until substantially all of the contaminated material has been caused to flow out of the weld area into the form of a flash and a true pressure weld has been formed between clean and uncontaminated surfaces of said workpieces.

8. The process of effecting a pressure weld between dirty and contaminated end faces of relatively thin, pressure weldable metal material comprising:
 (a) grasping the material to be welded by die means with said dirty and contaminated end faces facing each other and projecting from the die means a sufficient distance to produce an upset in a weld area by actuation of said die means,
 (b) actuating said die means to bring said end faces together under pressure sufficient to produce an upset and cause lateral flow of contaminated material out of the weld area into the form of a flash and,
 (c) repeating the grasping and upsetting steps until substantially all of the contaminated material has been caused to flow out of the weld area into the form of a flash and a true pressure weld has been formed between clean, uncontaminated faces of said material.

9. The process of pressure welding comprising:
 (a) grasping pressure weldable, malleable metal material by die means near two dirty and contaminated end faces of said material with two sections of said material, including said end faces, projecting from said die means a sufficient distance to produce an upset by actuation of said die means,
 (b) preparing said sections of said material for subsequently effecting a true pressure weld by actuating said die means to force said sections together to produce an upset in a weld area, thereby causing contaminated material to flow out of the weld area into the form of a flash,
 (c) releasing said material and grasping two other portions by said die means a sufficient distance from the flash to produce an upset by actuation of said die means,
 (d) and repeating the grasping and upsetting steps until substantially all of the contaminated material has been caused to flow out of the weld area into the form of a flash and a true pressure weld has been formed between clean and uncontaminated portions of said material.

10. The process of pressure welding comprising:
 (a) gripping portions of pressure weldable, malleable metal material with a pair of split dies, said portions having dirty and contaminated ends facing each other and extending from the respective dies a sufficient distance to produce an upset when said dies are closed together,
 (b) preparing the ends of said material for subsequently effecting a true pressure weld in a weld area by forcing said ends and said dies together to produce an upset, thereby causing contaminated material to flow out of the weld area in the form of a flash and overcoming any misalignment of said ends, (c) opening said dies, (d) moving said dies away from one another, (e) closing said dies to regrip the material a sufficient distance from the weld area to produce an upset when said dies are again forced together, and (f) repeating the gripping and upsetting steps until substantially all of the contaminated material has been forced out of the weld area in the form of a flash and the true pressure weld has been formed between clean and uncontaminated surfaces.

11. The process of claim 10 wherein said dies are moved an equal distance after the completion of step (c) and a flash is midway between said dies during step (e).

12. The improved method of producing a true pressure weld between pressure weldable metal materials at temperatures less than required for heat welding comprising the steps of grasping first and second workpiece portions by first and second weld forming dies with said workpiece portions extending from the respective dies a sufficient distance to produce an upset when the dies are forced together and so that said workpiece portions have dirty and contaminated surfaces orientated toward one another, and first and second dies being in spaced relationship; thereafter forcing said first and second dies together to upset said workpiece portions by mutual contact under pressure, thereby flowing contaminated material out of the weld area in the form of a flash and preparing said workpiece portions for subsequently effecting a true pressure weld; thereafter releasing the grip of said dies on said workpiece portions followed by indexing of said dies into spaced relationship; regrasping said workpieces a distance from the weld area sufficient to form an upset when said dies are again forced together; and repeating the upsetting work cycle to upset additional parts of said workpiece portions at least a second time until substantially all of the contaminated material has been caused to flow out of the weld area in the form of a flash and a true pressure weld has been formed between clean and uncontaminated surfaces.

References Cited in the file of this patent

UNITED STATES PATENTS

| | | |
|---|---|---|
| 2,567,012 | Donelan | Sept. 4, 1951 |
| 2,697,954 | Sowter | Dec. 28, 1954 |
| 2,698,548 | Sowter | Jan. 4, 1955 |
| 2,763,057 | Clair | Sept. 18, 1956 |
| 2,863,344 | Barnes | Dec. 9, 1958 |
| 2,891,430 | Johnson | June 23, 1959 |
| 2,894,321 | Dubilier | July 14, 1959 |

FOREIGN PATENTS

| | | |
|---|---|---|
| 151,762 | Australia | June 8, 1953 |
| 728,139 | Great Britain | Apr. 13, 1955 |
| 793,402 | Great Britain | Apr. 16, 1958 |

OTHER REFERENCES

The Welding Journal, Cold Pressure Welding, August 1951, pages 731–736.

Nolle: German Printed Application D16645, Aug. 30, 1956.